Aug. 29, 1961  H. SCHEFFOLD  2,997,935
EXCHANGEABLE PHOTOGRAPHIC OBJECTIVE
Filed Aug. 12, 1958  2 Sheets-Sheet 1

Inventor:
Hermann Scheffold
by Matern and Rollin
Attorneys

United States Patent Office 2,997,935
Patented Aug. 29, 1961

2,997,935
EXCHANGEABLE PHOTOGRAPHIC OBJECTIVE
Hermann Scheffold, Munich, Germany, assignor to Photogrammetrie G.m.b.H., Munich, Germany
Filed Aug. 12, 1958, Ser. No. 754,671
Claims priority, application Germany Aug. 16, 1957
8 Claims. (Cl. 95—45)

This invention relates to improvements in exchangeable photographic objectives of novel construction which comprise a detachable socket for a photographic camera, the socket being especially designed to removably hold and operate a plurality of objective lenses of varying optical characteristics, including a telescopic device for sharp focusing, means for securing the socket to a camera and means for actuation of a shutter adjustment and the telescopic device, said socket and said means being constructed as a single unit.

According to the present invention, the fitting containing the lenses and the shutter, hereinafter referred to as exchangeable units, may be exchanged to the exclusion of a socket which is rigidly, or in some instances also interchangeably, connected with the camera. This socket contains the telescopic device for sharp focusing and also such components as may advantageously be use with a plurality of exchangeable units.

This principle of construction leads to a considerable simplification of the parts to be exchanged, i.e., of the exchangeable units, since for each of those the same single socket always is employed. This, in turn, leads to a saving in weight and also in the manufacturing costs. Also, other facilities convenient to use, e.g., a mechanism for preselection of lenses, may easily be installed in that socket, thereby being connected only with that socket, and are not part of each individual exchangeable unit as has hitherto been customary. The higher costs connected therewith are much less than the expenses for installing them in each exchangeable unit. When, according to the present invention, construction parts for actuation of the lens and/or for reading the shutter opening are installed in the socket, corresponding attachment organs are present between the exchangeable unit or the shutter inside the latter and the socket. It follows that for all exchangeable units, fitting the same socket, the angle ranges of the shutter-actuating organs between equal shutter opening must be the same. This can be effected in a known manner by selecting suitable lamella diameters and shapes.

Because exchangeable units of different focal length require different telescope extension for sharp focusing, distance scales are provided on the rotatable distance-selector ring on the socket. These scales correspond to the focal length of the exchangeable units. Advantageously, the exchangeable units are provided with an overlapping ring of such length that its edge sweeps over the distance scale on the socket fitting the proper focal length. On this ring, the corresponding depth of focus scale may also be installed.

In another embodiment according to the present invention, the socket is provided with a telescopic device which, at one and the same angle of rotation of the distance-selector ring, offers one telescope setting out of a selection of two or more. This corresponds to a stepwise changeable gear between the distance-selector ring and the axially slidable connection in which the exchangeable units are placed. The gear ratios preferably are fitted to the different focal lengths of the exchangeable units in such a manner that a single distance scale suffices.

In still another embodiment of the present invention, the socket for the exchangeable units is provided with a telescopic device of known construction having only one effective pitch which is suited for all respective focal lengths of the exchangeable units. This does away with the changeable gear mentioned above including the necessary shifting device, resulting in a simplified and less expensive embodiment of the socket.

Because a device having only one effective pitch by itself does not suffice to solve the problem at hand, two distance scales are provided since the uniform thread pitch for all focal lengths of the exchangeable units requires telescope paths which are larger than one thread pitch at close ranges customary for longer focal lengths. Therefore, the distance scale must be readable beyond a full rotation of 360°. This is accomplished according to the present invention by installation of a second distance scale as continuation of the first scale at another location, i.e., either at the distance selector ring or at a ring connected with the same.

The feasibility of using a single socket for exchangeable units having different focal lengths therefore is attained either by means of a plurality of distance scales or by means of a changeable gear for the telescopic device, or by both these means.

The object of the invention will now be further explained with the aid of the accompanying drawings which illustrate two preferred embodiments. However, it should be understood that these are given merely by way of explanation, not of limitation, and that numerous changes may be made in the details without departing from the spirit of the present invention.

Figure 1:
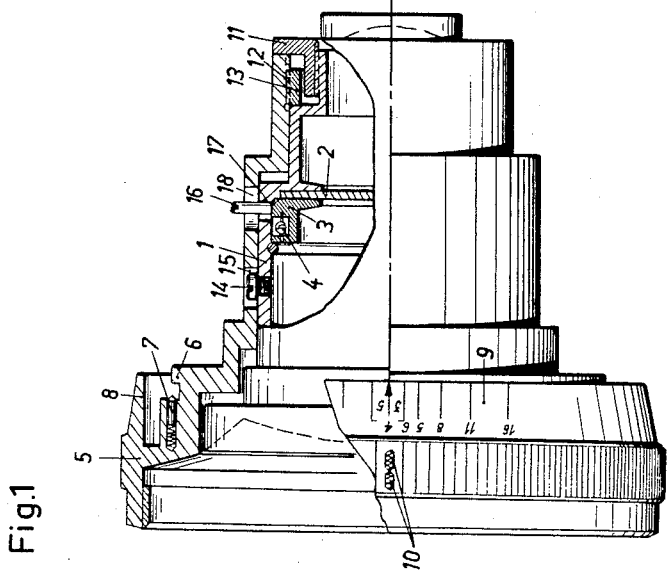
FIG. 1 shows part of a longitudinal section of an exchangeable unit.

Referring now to FIG. 1, the exchangeable unit consists of a fitting 1 holding the lenses which, in a manner known per se, also holds the iris diaphragm 2, whose rotatable part 3 is pressed into the end position by spring 4, e.g., for the smallest lens opening. The outer body 5 encloses fitting 1; it carries at its front a bayonet lug 6 and a spring-actuated drop-in pin 7 for fastening of the exchangeable unit in the socket. On the overlapping ring part 8 of the outer body 5 the depth of focus scale 9 and identification marks 10 are installed. The fitting 1 is pulled and held in place with the threaded ring 11 against stop ring 13 which is disposed in the outer body 5 and is adjustable relative thereto by means of thread 12. The fitting 1 is secured from turning against outer body 5 by bolt 14 whose head is movable within the elongated hole 15 disposed in the outer body 5. Pin 16, connected to the rotatable lens part 3, projects through the slits 17 and 18 in the fitting 1 and in the outer body 5, respectively, and serves as connection in cooperation with its counterpart in the socket, i.e., tongue 30, as shown in FIG. 2.

Figure 2:
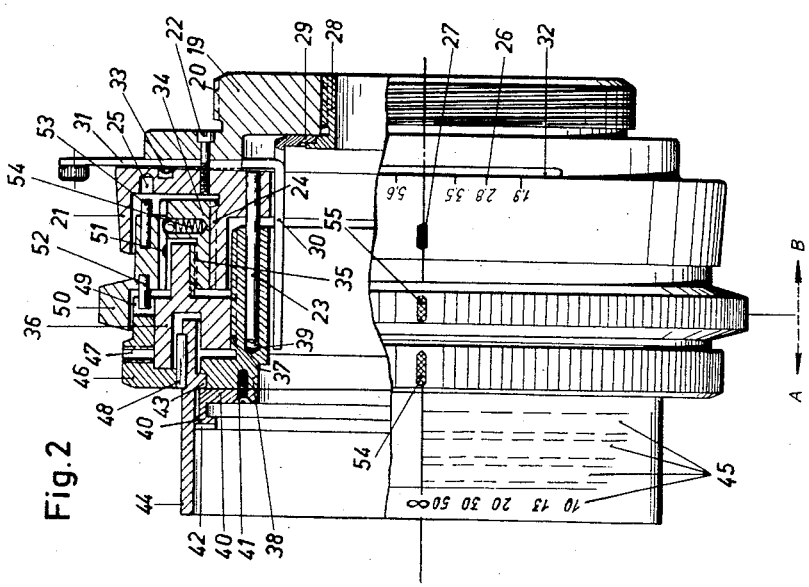
FIG. 2 shows the socket fitting that exchangeable unit and having four distance scales and a changeable gear with transmissions to adapt the socket to different focal lengths of the several exchangeable units, likewise in a partially axial section.

Referring now to FIG. 2, the socket consists of the connecting ring 19 which is provided, e.g., with a thread 20 for fastening to the camera. Ring 21 is rigidly connected with connecting ring 19 by means of bolts 22. It carries on its inside a guide pin 23, has a thread 24 for the telescope movement and a stop 25. On its outside are disposed lens scale 26 and a mark 27.

On fixing ring 28, which is connected to connecting ring 19, the lens drive ring 29 is positioned rotatably with a tongue 30 which projects into the socket parallel to the axis thereof and with a lever 31, projecting radially outward for the actuation of the lens and for indicating the lens opening on lens scale 26. A notch 32 in connecting ring 19 enables lever 31 to move. The latter also can engage in a known manner in several notches corresponding to the lens openings, e.g., by means of detent 33 in the corresponding recesses of ring 21.

The threaded ring 34 is positioned rotatably on thread 24 of ring 21. Threaded ring 34 also has an outer thread 35 on which ring 36 is positioned rotatably. The telescope 38 is screwed into the inner thread 37 of ring 36. Telescope 38 carries the hold 39 for guide pin 23 and also the bayonet counterring 40 by means of bolts 41. Furthermore, telescope 38 has a stop 42 for the spring-actuated pin 7 in the outer body 5 of the exchangeable unit. The two parts 38 and 40 thus together form an annular groove 43 for positioning of the distance scale ring 44 on which are disposed a plurality of distance scales 45 for different focal lengths.

Above the distance scale ring 44, a distance setting ring 46 is disposed which is fastened to ring 36 by means of bolts 47. A spring 48, set in the distance scale ring 44, engages in a groove in the distance setting ring 46.

The setting ring 50 is positioned on threaded ring 34 and is slidable axially by means of springs 51. Ring 50 is provided with two connecting pins 52 and 53 which in the end positions of the axial sliding connect ring 50 either with the distance setting ring 46 or with ring 21 by engaging the stops 49 or 25, respectively. In both end positions, the setting ring 50 is arrested by a spring pressed detent 54 of known construction, e.g., by a ball with spring.

The mode of operation of the present invention is as follows:

When the exchangeable unit shown in FIG. 1 is placed in the socket shown in FIG. 2, diaphragm 2 at first is in the position of the smallest opening due to the action of spring 4. While turning the exchangeable unit upon insertion in order to close the bayonet closure until the stop pin 7 meshes with stop 42, pin 16 is kept in place by the tongue 30, which is disposed in any desirable position, and thereafter the lens 2 is opened as far as corresponds to the position of lever 31 as shown on the lens scale 26. The exchangeable unit in the socket acts with its ring part 8 over the distance scale ring 44 to that distance scale 45 which applies to the focal length of the particular exchangeable unit. Instead of differently overlapping ring parts 8, equally long ring parts can be used having windows in such positions that only the corresponding distance scale 45 is entirely or partially visible.

The number of distance scales 45 in the socket in that arrangement is determined by the number of installable exchangeable units with different focal lengths which fit the same socket.

The number of applicable exchangeable units can be increased by means of a changeable gear in the socket between the distance setting ring and the telescope. The changeable gear, also shown in the embodiment according to FIG. 2, acts as follows:

The axial movement of the telescope 38, guided by pin 23, takes place by rotation of ring 36 which is connected on one side, by thread 37 with part 38 and, on the other side, by thread 35 with threaded ring 34. The latter, in turn, is connected with the stationary ring 21 by means of thread 24.

The setting ring 50, axially slidable on the threaded ring 34, has two end positions A and B, respectively. In the position A, shown in FIG. 2, pin 52 engages stop 49 of the distance setting ring 46 and thereby blocks the rotational motion in thread 35. When the setting ring 50 is pushed into position B, locking with respect to part 46 and therefore also to ring part 36 is released. Simultaneously, the rotational motion in thread 24 is locked as pin 53 is pushed into stop 25.

Consequently, the drive of the telescope 38 differs from known constructions having guides and two threads by the fact that as the second thread optionally one of the two threads 24 and 35 acts as moving thread and that two differently effective pitches or transmissions, respectively, of the drive are attained by that difference in pitch or in the direction of the threads (right- and left-hand threads). By suitable choice of the pitch it is possible to use the same distance scale for exchangeable units with two different focal lengths.

The marks 27, 54 and 55 on the socket serve for the demarcation of the right position of parts 46 and 50 with respect to part 21 for the change of gears.

The correct position of setting ring 50 can, in each case, be denoted by a marking picture 10 on the exchangeable unit and can be made even more distinctive by the use of colors.

Figure 3:
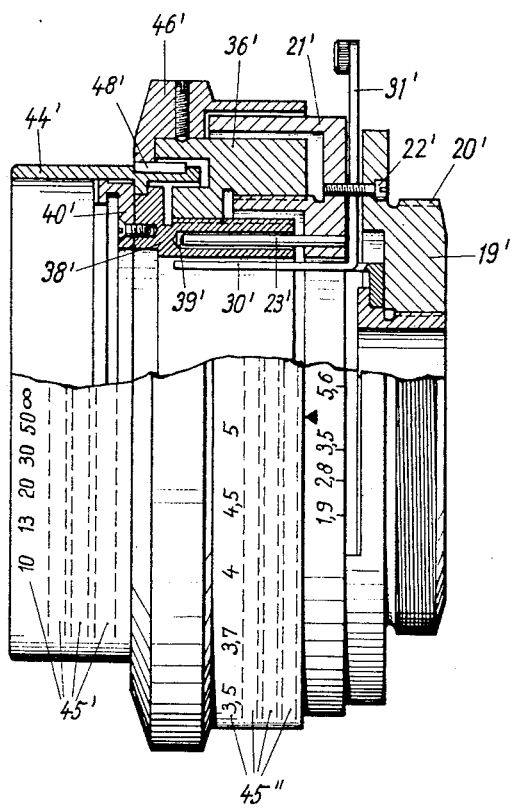
FIG. 3 shows a socket, partially in axial longitudinal section and partially in plan view, which has only a single telescope thread.

In a further embodiment, the socket (FIG. 3) receiving the exchangeable unit (FIG. 1) may be installed at the front of the camera (not shown) by means of ring 19' carrying thread 20'.

The outer or front ring 44' of the socket is disposed rotatably around the telescopic device 38' and is connected to the distance selector- and scale ring 46'. The connection is accomplished by means of a spring 48' disposed in ring 44' which spring slides in a groove of selector ring 46'. Ring 44' carries the distance scales 45' for the several exchangeable units of different focal lengths. The values of these scales range from the infinity setting to close ranges for which the required extension corresponds to the pitch of the thread of the telescope 38' and which requires a full rotation of ring 46'. Ring 46' overlaps ring 21' and carries the extension scales 45' on ring 44' for those distances to which an extension in the magnitude between one or two thread pitches, respectively, of telescope 38' corresponds.

By this arrangement, extensions over two thread pitches can be read and are utilized. This means that a single extension thread for the exchangeable units, even those having greater focal lengths, can attain normal close range settings, whereas the close range for exchangeable units of short focal lengths can yet be extended without subdividing the corresponding scales too roughly or having the scale values in too close a proximity.

I claim:

1. A photographic exchangeable objective device for attachment of one of a plurality of objectives to a camera housing, comprising a socket releasably secured to the camera housing, said socket including a separation mechanism for the objective and a diaphragm adjustment device for each of the objectives attached to said socket, and having a distance setting ring thereon and a distance scale ring connected with said setting ring, said distance scale ring having a plurality of distance scales arranged thereon, each of said scale being adapted respectively for one objective having a specific focal length, and a plurality of objectives having varying focal lengths, each of the objectives consisting of a housing, a lens set and a diaphragm mounted in said housing, each of said objectives being adapted for insertion in said socket one at a time.

2. A photographic exchangeable objective device according to claim 1, wherein the objectives selectively attachable to the socket of the housing are provided with a ring covering the distance scales on the scale ring located on the socket, the edge of said ring lying in front of the distance scale applicable to this objective.

3. A photographic exchangeable objective device according to claim 1, in which the objectives selectively attachable to the socket of the housing are provided with a ring covering the distance scales on the scale ring located on the socket, in which there is arranged above the distance scale applicable to this objective a window leaving said scale free.

4. The photographic exchangeable objective according to claim 1, wherein said objectives and said setting rings have corresponding colored markings.

5. A photographic exchangeable objective according to claim 1, further provided with means for setting and displacing the diaphragm and a coupling member which is coupled automatically with the coupling member of the diaphragm in the exchangeable objective during the insertion of the latter.

6. A photographic exchangeable objective according to claim 5, wherein the diaphragm setting members are connected to a spring diaphragm mechanism.

7. A photographic exchangeable objective device according to claim 1, further provided with telescopic means for the reception and securing of the exchangeable objectives, said telescopic means being secured against twisting and being axially displaceable, and including thread means in engagement with the distance setting ring for displacing an objective.

8. A photographic exchangeable objective device according to claim 7, wherein the distance setting ring is rotatable by an angle exceeding 360° and wherein the distance scales for close range corresponding to a rotation angle exceeding 360° and continuing those on the distance scale ring connected to the distance setting ring for the range from infinity down to a certain distance corresponding to a rotation angle up to 360°, are arranged on the distance setting ring.

References Cited in the file of this patent

UNITED STATES PATENTS

| | | |
|---|---|---|
| 2,279,476 | Mihalyi | Apr. 14, 1942 |
| 2,357,327 | Harris et al. | Sept. 5, 1944 |
| 2,469,691 | Lee | May 10, 1949 |
| 2,805,609 | Nerwin | Sept. 10, 1957 |
| 2,856,830 | Meixner et al. | Oct. 21, 1958 |

FOREIGN PATENTS

| | | |
|---|---|---|
| 769,081 | Great Britain | Feb. 27, 1957 |